United States Patent Office 3,658,948
Patented Apr. 25, 1972

3,658,948
HOT MELT COMPOSITION COMPRISING MALEATED POLYETHYLENE AND POLYOLEFIN
Richard L. McConnell, Kingsport, Tenn., assignor to Eastman Kodak Company, Rochester, N.Y.
Continuation-in-part of abandoned application Ser. No. 693,737, Dec. 27, 1967. This application Nov. 23, 1970, Ser. No. 92,135
Int. Cl. C08f 29/12
U.S. Cl. 260—897 B 5 Claims

ABSTRACT OF THE DISCLOSURE

A hot melt adhesive coating composition comprising about 40 to about 95% by weight of maleated polyethylene and about 5 to about 60% by weight of a poly-α-olefin having from 2 to 10 carbon atoms, a density in the range of about 0.83 to about 0.98, and a melt index in the range of about 0.1 to about 250, said composition having a melt viscosity within the range between about 1,000 and 100,000 cps. 150° C. Such coating compositions have excellent adhesion to both paper and ink-printed areas, excellent toughness and improved resistance to stress cracking. Improvement is especially notable when the coating thickness is in the range of between about 2 and about 100 mils.

---

This application is a continuation-in-part of U.S. Ser. No. 693,737, filed Dec. 27, 1967, by Richard L. McConnell now abandoned.

This invention relates in general to hot melt compositions, and more particularly, this invention relates to hot melt adhesive coating compositions which are especially effective and useful in connection with either printed or unprinted paper substrates.

The hot melt composition according to this invention is useful as a medium for attaching two substrates together as well as a coating material where requirements of adhesion to the substrate are rigid. The adhesive has good peel strength, while at the same time is flexible enough to prevent stress cracking. The direct application of various plastic coating compositions, in the hot melt or molten state, to paper and similar substrates, has found increasing commercial use, avoiding, as it does, the necessity of employing solvents or like carriers with possible adverse effects on the substrate, and obviating the necessity of attendant solvent recovery systems. It has been found, however, that in order to provide satisfactory coatings, particularly for paper webs carrying colored pictures, printing, or the like, it is important that, in addition to strong adhesive properties, the coating should be resistant to blocking and abrasion, as well as having high resistance to grease, stains, stress cracking, and the like. This is especially true in cases wherein the coated substrate is subjected to embossing, such as, for example, providing lenticulated surfaces on coatings on three-dimensional pictures.

In previous hot melt coating compositions having some of the important characteristics just mentioned, problems involving poor adhesion have been encountered, and it has been believed quite advantageous to incorporate some type of synthetic resin, natural resin or modified natural resin as an additive, e.g., pinene-based resins (see Hagemeyer and Etter Ser. No. 404,775, filed Oct. 19, 1964, and now abandoned) in order to provide a high degree of adhesion between the coating and the substrate, e.g., printed material such as paper. It has been found, however, that incorporation of such resinous additives frequently results in several disadvantages. Possibly the most important problem is that such additives generally have less than the desired aging characteristics, resulting in degradation of the hot melt composition either in extended storage or some time after it has been applied to the substrate.

Another problem encountered in the mase of the compositions containing pinene-based resins or the like is the tendency of the hot melt coating compositions to stick to the embossing cylinder. Furthermore, such additive resins as those of the pinene type generally impart color to the hot melt compositions. Also, processability is generally adversely affected. Moreover, adhesive properties may vary in an unpredictable manner depending on the type of ink and/or paper.

According to one embodiment of this invention there is provided a flexible sheet having a transparent layer of a coating composition essentially composed of about 40% to about 95% by weight of maleated polyethylene and about 5% to about 60% by weight of a polymer of at least one α-olefin having from 2 to about 10 carbon atoms, a density in the range of about 0.83 to about 0.98 and a melt index in the range of about 0.1 to about 250 and the maleated polyethylene has a saponification number in the range between about 2 and about 50. With less than about 40% maleated polyethylene in the composition, the adhesive strength becomes undesirable. With greater than about 95% maleated polyethylene, the adhesive layer or coating becomes so brittle as to result in stress cracking.

As used herein, density is measured in grams per cubic centimeter and in accordance with ASTM Designation D1505; melt viscosity, when expressed in cps. at 150° C., is measured in accordance with ASTM D1824 (Brookfield); melt viscosity, when expressed in cps. at 190° C., is measured in accordance with ASTM D1238 using 0.04±0.0002 inch orifice; Melt Index is measured in accordance with ASTM D1238 using .0825±0.0002 inch orifice. Saponification number is a common term which is dealt with at length in U.S. Pat. No. 3,480,580.

Preferably, the coating composition has a melt viscosity at 150° C. in the range between about 1,000 and about 100,000 cps.

Even more specifically, according to this invention, there is provided a sheet as defined above wherein said maleated polyethylene incorporated in said composition has a density in the range between about 0.89 and about 0.97, has a melt viscosity at 150° in the range between about 1,000 and about 100,000 cps., and has a saponification number in the range from about 2 to about 50, and the poly-α-olefin (homopolymer, copolymer, or mixture thereof) incorporated in said composition has a melt index in the range between about 0.1 and about 250 and a density in the range between about 0.83 and 0.98.

Most advantageously said poly-α-olefin is derived from one or more α-olefins containing 2 to about 6 carbon atoms and the poly-α-olefin has a density in the range between about 0.83 and 0.98.

Novel adhesive coating compositions, in accordance with this invention, are provided by those compositions composed of about 40 to 95% by weight of maleated polyethylene and about 5 to 60% by weight of a poly-α-olefin including mixtures of poly-α-olefins and the maleated polyethylene has a saponification number in the range between about 2 and about 50, essentially the entire value of said number being accounted for by acid groups chemically associated with the polymer chain as described in Knowles and Winebarger application U.S. Ser. No. 691,099, filed on Nov. 29, 1967, which is a continuation-in-part of application Ser. No. 643,872, filed on June 6, 1967, now abandoned said continuation-in-part being incorporated herein by reference.

This invention provides excellent hot melt compositions having sufficient flexibility to withstand folding, excellent adhesion to essentially all types of paper and printing inks, high resistance to blocking and staining, as well as to abrasion; moreover, these compositions are non-toxic, colorless, have excellent heat stability and have improved resistance to stress cracking. Improvement in toughness and resistance to stress cracking is especially noteworthy when the coating thickness is in the range of about 2 to about 100 mils. These properties are quite valuable when coated flexible sheets are rolled one or more times such as for insertion in a mailing tube.

An especially preferred composition range has been found to be:

|  | Percentages by wt. |
|---|---|
| Reaction product of polyethylene and maleic anhydride | 70–90 |
| Polymers of one or more α-olefins having 2–6 carbon atoms | 30–10 |

In producing the maleated polyethylene resin employed according to this invention, maleic anhydride and polyethylene can be advantageously reacted at a temperature of from 200° C. to 400° C., in the absence of oxygen and catalyst, for from about 15 minutes to 4 hours, the reaction time being dependent on the temperature. The resulting product can then be advantageously refined by removal of excess maleic anhydride, e.g., by purging the reaction product with an inert gas such as nitrogen or even more advantageously by stripping it at low pressures in a thin film evaporator as described in said Knowles et al. application while the melt temperature is between 125° C. and 300° C. The product can then be blended with a compatible polymer or copolymer of one or more α-olefins containing 2 to 10 carbon atoms as more specifically defined above.

In a preferred aspect of this invention, polyethylenes having a density in the range between about 0.89 and about 0.97 and melt viscosity in the range between about 1,000 and about 100,000 cps. at 150° C., are reacted with about 0.1% to about 5.0% maleic anhydride at a temperature between 200° C. and 320° C. for a period of 15 minutes to one hour. The resulting product is then advantageously refined by stripping it in a thin film evaporator at a pressure of about 1 mm. of Hg or less. The maleated polyethylene produced may have a melt viscosity in the range between about 1,000 and about 100,000 cps. at 150° C. and a saponification number from about 2 to about 50. It may then advantageously be blended to produce a blend containing about 5% to 60% by weight of an α-olefin polymer as described above. Such polymers are illustrated by polyethylene having a density in the range of 0.90 to 0.97, and a melt index in the range of about 0.1 to about 250. Various typical polyethylenes which may be used include Tenite 812 (melt index 200), Tenite 811 (melt index 20), Tenite 800 (melt index 1.7), Tenite 808 (melt index 7), Tenite 1000 (melt index 0.7), Tenite 1001 (melt index 1.6), Tenite 1002 (melt index 6.9), Tenite 1917 (melt index 29), Tenite 3310 (melt index 0.6), Tenite 3370 (melt index 8.5), Tenite 3460 (melt index 5.0), and the like. "Tenite" is Eastman Kodak Company's trademark. Other suitable polyolefins which are compatible with maleated polyethylene and which improve the toughness and stress crack resistance of the maleated polyethylene include poly-1-butene, copolymers of propylene and 1-butene containing about 10 to about 95% 1-butene, copolymers of 1-butene and 4-methyl-1-pentene containing about 10 to about 95% of 1-butene, copolymers of propylene and 1-hexene, and the like. The amount of α-olefin polymer, modifying copolymer or mixtures thereof which can be advantageously employed is generally in the range of about 5 to about 60%. The melt viscosity of the blend is preferably in the range of about 1,000 to about 100,000 cps.

The coating composition blends useful in this invention may be prepared by making pellet blends of the maleated polyethylene and the olefin polymer or polymers and then melting and circulating the molten blend in a melt coating machine. The components of the blend may also be mixed in typical mixing equipment used for polyolefins, e.g., Banbury mixers, hot rolls, screw-type extruders, etc.

Reference is directed to copending U.S. Pat. application filed by McConnell and Joyner, Ser. No. 692,703, filed Dec. 22, 1967, now U.S. Pat. No. 3,579,486, which discloses a process for treating maleated polyethylene so as to eliminate noxious gases which may be formed when it is used in a molten condition during melt coating; such treatment comprises neutralizing with a base such as an organic amine, metal alkoxide, organic phosphite, or the like.

This invention will be further illustrated by the following examples of preferred embodiments, although it will be understood that these examples are included merely for purposes of illustration and are not intended to limit the scope of the invention.

EXAMPLES I, II AND III

Illustrative hot melt compositions are prepared using percentages by weight according to the following Examples I, II and III. Example I is provided for comparison and is described and stereograms are claimed in Brunson and Douglas patent application Ser. No. 685,957, filed on Nov. 27, 1967, now abandoned.

| Component | Examples | | |
|---|---|---|---|
|  | I | II | III |
| Maleated polyethylene | 100 | 85 | 80 |
| Polyethylene having melt index of 200 and density of 0.913 |  | 15 | 20 |

The maleated polyethylene in these examples is more specifically characterized as having a melt viscosity of about 9,000 cps. at 150° C. and a saponification number of about 5.

The hot melt compositions are coated on printed paper using a hot melt coating and embossing machine made by the Harris-Seybold Company but having a coating head for applying the coating composition which applies beads or ribbons of the hot melt which are then spread to form a uniform thickness and embossed. The following conditions are maintained:

Coating head—280° F.
Embossing cylinder—20° F.
Melt temperature—280° F.
Machine speed—1870 sheets/hour
Coating thickness—10 mils The ink-printed paper test specimens employed are on Kromekote paper, made by Champion Paper Company with a lithographically reproduced scale which is a 4-color ink-printed test gradient having bands of colored dots covering 100%, 80%, 60%, 40%, 20% and none of the area in each band. The processability of the coating composition is excellent; at least 150 sheets are coated and embossed without sticking to the embossing cyclinder.

Adhesion ratings are set up on the 4-color scale as follows:

Coating sticks to paper specimens as follows:

Rating:
- −1 ____ Does not stick to ink-printed areas nor to the paper.
- 0 ____ Sticks to paper only, not to ink-printed areas.
- 1 ____ Sticks where 20% of specimen is printed.
- 2 ____ Sticks where 40% of specimen is printed.
- 3 ____ Sticks where 60% of specimen is printed.
- 4 ____ Sticks where 80% of specimen is printed.
- 5 ____ Sticks where 100% of specimen is printed.

Adhesion ratings of −1 are given to Coating Composition Formulas that do not stick to either the paper or the ink-printed areas. Ratings of 1 to 5 are given depending on the extent that the formulas stick to the printed 4-color scale as set forth in the above tabulation of adhesion ratings. The determination is based on ink density at which fiber tear occurs during peeling of the coating from the printed paper.

After the hot melt compositions are coated on the printed paper as described above, specimens thereof are aged for 72 hours and 168 hours and evaluated as to adhesion ratings described above. The following results are averages based on specimens picked at random from coated and embossed sheets:

| Examples | Adhesion evaluation after aging | |
|---|---|---|
|  | 72 hours | 168 hours |
| I | 5.0 | 4.9 |
| II | 5.0 | 4.9 |
| III | 5.0 | 4.8 |

All of the above compositions are used to coat printed sheets on the machinery at standard settings without sticking to the embossing cylinder or jamming the coater for a continuous run of 150 sheets, thereby passing what is known as a processability test. These formulas are especially advantageous as to processability. Example I provides a basis for comparison with other formulas disclosed in the above-mentioned Brunson and Douglas patent application.

EXAMPLE IV

A pellet blend is made which contained 85% of the meleated polyethylene specifically described above and 15% of polyethylene having a melt index of 200 and a density of 0.913. After being circulated in the coating machine described above, a sample of the melt is taken. The melt viscosity of the blend is 6,700 cps. at 190° C. Paper coated with a 30 mil thickness of this composition has good clarity, gloss and depth. The adhesion to the paper is good (rating of 5). No stress cracking of the coating is observed when the coated pictures are rolled into the shape of a tube and held in this configuration for a week. Similarly good results are achieved when this composition is prepared in an extruder at 140° C. and the blend is stabilized with 0.1% dilauryl thiodipropionate and 0.1% dioctadecyl p-cresol.

EXAMPLE V

A pellet blend cvontaining 80% of the maleated polyethylene specifically described above and 20% polyethylene (melt index 200; density 0.913) is prepared. This blend has a melt viscosity of 9,000 cps. at 190 C. Paper coated with a 30 mil thickness of this blend has a good appearance and the coating has good gloss and toughness. The coating does not stress crack when the paper is rolled into the shape of a tube.

Similarly good results are obtained when the pictures are coated with 5 and 10 mil thicknesses of the blend.

EXAMPLE VI

Blends containing 85% of the maleated polyethylene specifically described above and 15% by weight of a copolymer of 60% propylene and 40% 1-butene (melt index 5.2) or poly-1-butene (melt index 1.0) are prepared as described above and similar results are obtained. Similar results are also obtained using 5 to 45% by weight of Tenite 811 polyethylene (melt index 20; density 0.917); Tenite 1002 polyethylene (melt index 6.9; density 0.938), or Tenite 3370 (melt index 8.5; density 0.973). These blends are used to coat three-dimensional pictures at thicknesses of 30 and 50 mils. The coatings have good gloss, good adhesion and do not stress crack when the pictures are rolled into the shape of a tube.

EXAMPLES VII–XI

Several adhesive compositions are prepared and tested for peel strength at room temperature. A stripe of the hot melt adhesive of each composition is applied to natural kraft paper and to a lacquer-coated foil. In each instance, the stripe is ⅛ inch wide and 2 mils thick. A second sheet of the same material is placed in direct alignment and heat sealed to the first sheet. The bonded substrates are cut perpendicularly to the bond line into 1 inch wide strips. The bonded specimens are conditioned for at least 12 hours in a room maintained at 73° F. and 50% relatively humidity. The bonded specimens are attached to a fixed support by one end, and 100 g. weight is suspended from the other end forming a 180° peel angle. The weight is increased at increments of 30 g./min. until the bond begins to delaminate. The weight where this occurs minus 15 g. is recorded as peel, in grams per inch. In the examples which follow, the maleated polyethylene/polyethylene ratio is varied. The maleated polyethylene contains between about 0.5 and about 5% by weight of maleic constituents, a density between about 0.89 and about 0.97. The polyethylene has a density between about 0.89 and about 0.98, and a melt index between about 0.1 and about 250.

| Example | Adhesive formulation | Melt viscosity cps. at 190° C. | Peel strength Paper to paper | Peel strength Lacquer coated foil to lacquer coated foil |
|---|---|---|---|---|
| VII | 95% maleated polyethylene,[1] 5% polyethylene. | 11,200 | 600 | 128 |
| VIII | 50% maleated polyethylene,[1] 50% polyethylene. | 14,000 | 780 | 30 |
| IX (control). | 25% maleated polyethylene,[1] 75% polyethylene. | 25,000 | 65 | 30 |
| X | 95% maleated polyethylene,[2] 5% polyethylene. | 5,500 | 744 | 320 |
| XI | 50% maleated polyethylene,[2] 50% polyethylene. | 22,300 | 714 | 240 |

[1] Saponification Number of about 5.
[2] Saponification Number of about 31.

EXAMPLE XII (CONTROL)

An adhesive composition is prepared using about 75% Epolene N–15, a low viscosity crystalline polypropylene marketed by Eastman Chemical Products, Inc., and about 25% Epolene E–43, a maleated crystalline polypropylene marketed by Eastman Chemical Products, Inc. The composition had a melt viscosity of 3,100 cps. at 190° C. When melted and applied as a hot melt adhesive between substrates, it is found to be very brittle and that cracking occurs when it is flexed.

This invention makes it possible to use practically any good quality paper as a substrate. Heretofore only a small proportion of various types of commercially available paper would give consistently good results and would make it possible to achieve the minimum processability requirements described above. Thus, from 14 types of paper, 12 are satisfactory from the processability standpoint.

Various additives such as antioxidants, light stabilizers, heat stabilizers, dyes, slip agents, non-blocking agents, pigments or the like may be added, if desired, as is well known in the art.

Although the novel compositions of this invention are admirably suited to fulfill the requirements for hot melt adhesive coatings, especially on a discontinuous or spot coating basis, they are not limited to this end use. They are also quite advantageous in many other fields such as, for example, in making both decorative and barrier coatings and, in general, in applications where adhesion over heavily inked substrates is desired such as magazine covers, greeting cards, brochures, and various high quality printed and coated sheets, especially where a discontinuous coating (spot coating) process may be used. A wide range of thicknesses may advantageously be employed, such as from 1 to 100 mils; moreover, greater or smaller thicknesses are also useful in some instances.

I claim:

1. A hot melt adhesive coating composition comprising about 40% to about 95% by weight of maleated polyethylene and about 5% to about 60% by weight of a supplemental polymer consisting of one or more α-monoolefins having from 2 to 10 carbon atoms, a density in the range between about 0.83 and about 0.98 and a melt index in the range between about 0.1 and about 250, and said maleated polyethylene has a saponification number in the range between about 2 and about 50.

2. A composition as defined by claim 1 wherein said maleated polyethylene has a saponification number between about 4 and about 35.

3. A composition as defined by claim 1 wherein said supplemental polymer is polyethylene.

4. A substrate having applied thereto the coating composition of claim 1.

5. A substrate having applied thereto the coating composition of claim 1 in a thickness of between about 1 and 100 mils.

References Cited

UNITED STATES PATENTS

| | | | |
|---|---|---|---|
| 3,595,943 | 7/1971 | Brunson et al. | 260—897 B |
| 3,483,276 | 12/1969 | Mahlman | 260—897 |
| 3,284,380 | 11/1966 | Davis | 260—8 |

MURRAY TILLMAN, Primary Examiner

C. SECCURO, Assistant Examiner

U.S. Cl. X.R.

117—15, 155 UA, 161 UT, 161 UZ; 260—94.9 GD, 876 R

PO-1050
(5/69)

UNITED STATES PATENT OFFICE
CERTIFICATE OF CORRECTION

Patent No. 3,658,948                 Dated April 25, 1972

Inventor(s) Richard L. McConnell

It is certified that error appears in the above-identified patent and that said Letters Patent are hereby corrected as shown below:

Column 1, line 21, after "cps." insert ---at---.

Column 2, line 6, "mase" should be ---case---.

Column 2, line 35, after "D1238" insert ---;---.

Column 5, line 3, after "areas." insert ---Ratings of 0 are given to formulas that stick to the paper but not to an ink-printed area.---

Column 5, line 51, "cvontaining" should be ---containing---.

Signed and sealed this 6th day of March 1973.

(SEAL)
Attest:

EDWARD M.FLETCHER,JR.              ROBERT GOTTSCHALK
Attesting Officer                    Commissioner of Patents